(12) United States Patent
Forry et al.

(10) Patent No.: US 6,268,020 B1
(45) Date of Patent: Jul. 31, 2001

(54) METHOD OF FABRICATING HIGH SEALING GASKETS

(75) Inventors: John S. Forry, Lancaster; Brian C. Lehr, Pequea; Dennis M. Dempsey, Lancaster; Christopher L. Morris, Oxford; Linda L. Sload, Lancaster, all of PA (US)

(73) Assignee: Interface Solutions, Inc., Lancaster, PA (US)

( * ) Notice: Subject to any disclaimer, the term of this patent is extended or adjusted under 35 U.S.C. 154(b) by 0 days.

(21) Appl. No.: 09/110,354

(22) Filed: Jul. 6, 1998

Related U.S. Application Data

(63) Continuation of application No. 08/920,663, filed on Aug. 29, 1997, now Pat. No. 6,093,467.

(51) Int. Cl.$^7$ ........................................ B05C 5/00
(52) U.S. Cl. ..................... 427/284; 427/289; 427/300
(58) Field of Search .................... 427/284, 285, 427/230, 231, 429, 430.1, 439, 289, 290, 300; 428/64.1, 66.4, 66.6, 66.7

(56) References Cited

U.S. PATENT DOCUMENTS

| | | | |
|---|---|---|---|
| 448,343 | * 3/1891 | Holway . | |
| 2,070,918 | 2/1937 | Peterson et al. | 288/1 |
| 3,661,401 | 5/1972 | Farnam | 277/227 |
| 3,729,205 | 4/1973 | Kwok | 277/229 |
| 3,785,856 | 1/1974 | Gotoh | 117/75 |
| 3,837,657 | 9/1974 | Farnam et al. | 277/1 |
| 3,950,576 | * 4/1976 | Desverchere . | |
| 4,499,135 | 2/1985 | Mitchell et al. | 428/137 |
| 4,600,201 | 7/1986 | Lonne et al. | 277/1 |
| 4,635,949 | 1/1987 | Lucas et al. | 277/235 B |
| 4,741,965 | 5/1988 | Zerfass et al. | 428/447 |
| 5,082,297 | 1/1992 | Flasher | 277/230 |
| 5,145,190 | 9/1992 | Boardman | 277/166 |
| 5,194,696 | 3/1993 | Read | 174/65 |
| 5,240,766 | 8/1993 | Foster | 428/280 |
| 5,518,257 | 5/1996 | Breaker | 277/180 |
| 5,536,565 | 7/1996 | Halout et al. | 428/283 |

FOREIGN PATENT DOCUMENTS

| | | |
|---|---|---|
| 2711022 | * 9/1978 | (DE) . |
| 1583530 | * 1/1981 | (GB) . |

OTHER PUBLICATIONS

The Technologies Behind Fel–Pro's Specialty Sealing Products undated.

\* cited by examiner

Primary Examiner—Fred J. Parker
(74) Attorney, Agent, or Firm—Womble Carlyle Sandridge & Rice, PLLC

(57) ABSTRACT

A gasket having two opposed faces and an edge disposed therebetween is given a wide coating on the edge. The coating is sufficiently wide so that it goes from corner to corner on the edge and protrudes past the corner on at least one side of the gasket in a direction perpendicular to a facial plane of the gasket. The coating protrudes in an amount effective to give the gasket a sealing ability which is better than the sealing ability of the same gasket if it had a coating merely extending from corner to corner without protruding. A process for coating the gasket edges which are around the aperture comprises placing the gasket sheets together so that a cavity is formed by the apertures, the sides of the cavity are the aperture edges to be coated. The coating material is put into the cavity and contacts the edges to be coated to form the coated edges.

14 Claims, 5 Drawing Sheets

(2 of 5 Drawing Sheet(s) Filed in Color)

METHOD OF FABRICATING HIGH SEALING GASKETS

This application is a continuation of application No. 08/920,663 filed Aug. 29, 1997, U.S. Pat. No. 6,093,467.

BACKGROUND OF THE INVENTION

Field of the Invention

This invention relates to gasket sheets which have good sealing properties even at low flange pressures. More particularly, the present invention provides a gasket which can be used to seal fluids. Gaskets of the present invention, placed in a flange and having to seal against fluids, can seal against fluid leaks both going through the gasket sheet internally and across the gasket face.

Gasket sheets are used to seal fluids in engines. A number of solutions have been employed in order to obtain good sealability (sealing ability) in the gaskets.

Beading on the face of the gasket is known. Such beading is a raised area put on the face; this beading, however, does not extend past the edge and further does not extend onto the edge. Such beading is used to enhance sealing.

One gasket material which can be used to give a good seal at high temperatures is described in U.S. Pat. No. 5,240,766. This reference describes a gasket sheet material having fiber, filler, and binder. According to the reference, the filler component provides desirable sealability.

Another reference which describes gasket sheet materials is U.S. Pat. No. 5,536,565. This reference describes a gasket sheet material with fiber and filler. The filler component must include a gel-forming mineral. This filler gives the gasket good sealing properties, especially against polar liquids.

In spite of the wide use of gaskets to obtain a seal against fluids in engines, obtaining a good seal continues to be a problem in gasket sheet materials. Many gaskets do not seal well at low flange pressures. Other gaskets are given particular coatings in order to obtain a gasket sheet which will seal well. Unfortunately, such coatings are then responsible for the gasket having poor compression failure resistance.

The gaskets described herein provide good sealing ability even at low flange pressures. In some embodiments the gasket is not coated or has only a limited amount of a coating given in order to obtain good sealability, thus allowing the gasket to also be compression failure resistant.

SUMMARY OF THE INVENTION

A gasket sheet comprising two opposed faces, and an aperture with a gasket sheet edge (also called the aperture's edge or the aperture's gasket sheet edge) which is substantially perpendicular to the opposed faces. The sheet edge further has at least one body which forms a barrier or dam to retard fluid from going from the aperture, past the edge and across a face of the gasket. The barrier can protrude from the edge or from the gasket face. When the barrier protrudes from the edge it gets wider in a direction perpendicular to a facial plane of the gasket, and it protrudes past a corner plane at some point between the sheet edge and the aperture. The barrier is sufficiently wide to retard the flow of fluid from the aperture across the face of the gasket, thus the barrier protrudes a sufficient distance past the corner of the gasket sheet edge to be effective to give the gasket a better sealing ability than the gasket would have if the barrier stopped at a point in a plane going through the corner of the edge (stopped at the corner between the face and the edge).

In most embodiments of this invention the barrier is formed by a coating that is wider than the thickness of the aperture's gasket sheet edge, measuring the width of the coating going in a direction parallel to the sheet edge from one of the corners between the edge and the face through the other corner between the edge and the other face. The coating, at the edge, thus being sufficiently wide to protrude past at least one of said corners in a direction parallel to the surface of the sheet edge. The coating on the edge of the gasket sheet at the aperture goes beyond one of said corners in an amount sufficient to give the gasket a better sealing ability than the gasket would have if the coating was only as wide as the thickness of the gasket sheet edge and thus stopped at both corners. The coating, however, does not necessarily lap around the corner onto the face of the gasket, although optionally, it can.

The coating on the sheet edge, going beyond at least one of the corners laying between a face and the aperture's gasket sheet edge (where the edge meets a gasket face), is herein referred to as a "wide edge coating" or a "protruding coating". The corner is located at each side of the edge where it abuts the face, at the point between the face and the edge; this point can be identified easily as the point where the cut, frequently porous edge ends and the less porous, non-cut face of the gasket begins.

In some embodiments the gasket is given a protruding coating on the sheet edge which is around the outside of the gasket (coating C). This is a secondary sealing position which seals the fluid from leaking past the gasket and outside of the flange, and as such it is less preferred than the coatings on the aperture's edge which seals the gasket where the gasket is first and primarily exposed to fluid (giving a primary seal). The edge coating around the perimeter of the gasket (coating C), must protrude past at least one corner of the edge of the gasket sheet, and preferably, in embodiments where the facial plane does not go through the corner of the gasket edge, the coating protrudes past the facial plane.

The protruding coating, given to the gasket, may extend onto either or both faces, and may extend so far as to completely cover one or both faces of the gasket except that the coating must protrude to provide the barrier, and not be a level coating over the gasket. When the edge coating sticks up past the corner plane or facial plane at an edge, the coating provides a dam to retard fluids from going from the aperture past the edge and out onto the gasket face between the face and a flange; where the edge is a perimeter edge the coating protrusion will stop fluids from going past the gasket out of the flange.

Furthermore, a completely coated gasket can take advantage of the sealing ability provided by the instant invention, although in some embodiments, to preserve compression failure resistance the amount of coating is preferably limited to cover only a portion of the gasket, the rest of the gasket being left uncoated. In such embodiments it is preferred to use a wide edge-coating to seal off the aperture's gasket sheet edge to fluids that go through the gasket itself. Preferably, to preserve compression failure resistance a coating will cover up to about 50% of the gasket, and even more preferably it is limited to cover a maximum of about 30% of the gasket. In another preferred embodiment there is no coating on either face of the gasket so that the gasket has optimized compression failure resistance.

Compression failure resistance is the ability of a gasket structure to withstand pressure without deforming the gasket to the point of failure. The crush test is an industry accepted measurement of compression failure resistance. The degree of compression failure resistance that a gasket must have is typically set by the load that it will experience in a particular application or in a specific flange.

Suitably, the coating on the edge covers all of the portions of the edge which must be coated in order to give the gasket a good sealing ability. It may not be necessary, for example, to have the coating on the edge at bolt areas, or at non-porous portions of the edge. The edge is coated to allow the gasket to provide a better seal. Acceptable embodiments include instances where the coating covers major portions of the edge. The gasket sheet edge can, thus be coated in an effective amount to achieve a substantial sealing of the gasket along the edge of the aperture. The edge, for example, can be coated up to about 75% of the aperture's gasket edge. Such embodiments can be used for good sealing ability, where the very best sealing ability, obtained from coating the entire edge of the gasket does not have to be used. Preferably, however, the entire edge of the aperture is coated.

BRIEF DESCRIPTION OF THE DRAWINGS

The file of this patent contains drawings of FIGS. 1–3 executed in color. Copies of this patent, with color drawings, will be provided by the Patent and Trademark Office upon request and payment of the necessary fee.

In FIG. 2, going through the coating in a direction parallel to the edge of the gasket in the direction going from corner to corner, the coating is wider than the coated gasket sheet edge and in fact is sufficiently wide so that the coating itself protrudes past the corner on each side of the edge, and in this embodiment the coating also protrudes past the facial plane on both sides of the gasket. This gives the gasket a better sealing ability than it would have if the coating was level with the gasket on each face. It thus gives the gasket a barrier on the gasket sheet edge to retard the flow of fluids from the aperture across the face of the gasket sheet. In this embodiment the coating also extends out onto the gasket face on each side of the gasket. The coating is an acrylic latex.

In FIG. 2 the coating is seen to extend out onto the face of the gasket, but the coating from side to side in a direction parallel to the edge is wider than the distance from the surface of the coating passing through the gasket sheet and out to the surface of the coating on the other side. In FIG. 8 the barrier against fluids extends over the faces (25) and (33). In FIG. 2 on each side of the gasket the barrier against fluids rests on and inclines slightly over the gasket face.

DETAILED DESCRIPTION

A protruding coating is effective to retard or to stop the flow of fluids across the face of any gasket which must seal against fluids. The coating does this by providing a dam on the edge of the gasket. This "dam" is the protruding portion of the edge coating and is a preferred barrier to the fluid.

A soft gasket material can be given an edge seal on an aperture exposed to fluids and obtain a seal against the fluid. Surprisingly, there is no need to change the composition of the sheet material for any significant improvement in sealing ability. The edge coating delivers the seal. Surprisingly, in many cases there is no need for significant sealing ability in the base sheet. Furthermore, a base sheet with the edge seal can accommodate many different types of flanges without any change being made to the base sheet.

Any gasket material which seals against fluids can take advantage of the present invention. This includes coated or uncoated gaskets; soft gasket materials; and layered gaskets such as gaskets which have a compressible or non-compressible core in between two layers or which have an incompressible substrate sheet on one side of the gasket. In embodiments where the gasket has more than one layer, a protruding coating on the edge of the aperture could be only on one layer. Preferably, however, the protruding coating would extend across the layers completely in a direction from one of the corners between a face and the edge to the other corner between the other face and the edge and would go beyond at least one of the corners. Preferably the coating would penetrate and seal off any cracks present between the layers.

Figure 6:
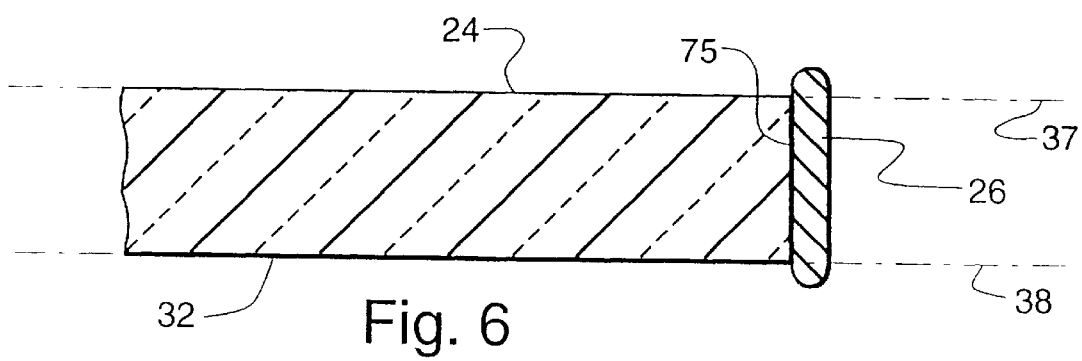
FIG. 6 is a drawing of an enlarged cross-section of a portion of a gasket having a coating on an aperture's gasket sheet edge (75). The edge (or edge surface) is substantially perpendicular to opposed faces (24 and 32). The coating (26) protrudes past "facial planes" or "corner planes" (37 and 38) on both sides of the gasket. Here, the facial plane and the corner plane are the same plane.

In some embodiments, the barrier extends in a direction perpendicular to at least one facial plane, past the corner between the gasket sheet edge and the face. Some embodiments have a barrier on the edge coating where the coating extends over the edge. Preferably the gasket will have barriers protruding past both corners of the aperture, such as in FIGS. 6 and 8.

Some embodiments of the present invention, however, are ideally suited and highly preferred for gaskets which are compressible and porous and which must also seal against fluids going through the gasket. In such a case, a wide edge-coating on an gasket sheet edge which covers the edge from corner to corner and past the corner; protruding past the corner plane in a direction perpendicular to the facial plane, will give the gasket a better sealing ability, especially since it seals against two types of fluid flow; both through the gasket and across the gasket face. This is particularly true where the aperture has been cut in the gasket. The cut edge will have more pores than another surface which is not cut even in porous and compressible gaskets. Coating the edge so that the coating penetrates or closes off the pores will be effective to seal off the pores to fluid which could seep through the gasket.

Soft gasket materials are preferred for use with the wide edge-coating of the present invention. Many types of soft gasket materials comprise fiber and a binder; other types of soft gasket materials comprise a binder and a filler, such as, for example, rubber and cork. Many soft gasket materials comprise fiber, binder, and filler. Such soft gasket materials have pores along the sheet edge where the aperture has been cut. These pores are detrimental to the sealing ability of the gasket. Thus, it is preferred to have an edge coating on the aperture's gasket sheet edge which will penetrate or at least close off the pores. In some embodiments the aperture is a bolt hole.

When the gasket sheet material comprises fiber and binder, in most cases, a filler is also present. The gasket sheet should have at least 1% by wt. of the binder and at least about 5% by wt. of the fiber. Filler can also be added at a minimum level of about 1%. Suitable ranges are from about 3 to about 40% by wt. of the binder, from about 5 to about 70% by weight (wt.) of the fiber, and from about 1 to about 92% by wt. of the filler.

Preferred gaskets that can use the present edge seal are gaskets for intake manifolds, oil pan gaskets (sealing against oil); cover gaskets such as a valve cover (which seals against oil) or an axle cover (which seals against gear lubricant); and compressor gaskets which are frequently exposed to refrigerants such as freon; a gas meter gasket which seals gas; a water pump gasket which seals against water and antifreeze; and a gasket for an industrial flange which will seal against steam and/or chemicals. The type of coating for each application is important to achieve preferred embodiments since some particular types of coatings will hold the particular fluid better than others. This wide edge sealing design has, in fact been found to be surprisingly suited for sealing oil pans of diesel engines and for sealing vacuum in intake manifolds against air and fuel mixtures. Chloroprene polymer and acrylonitrile are the preferred coatings for embodiments with exposure to refrigerants; acrylic or acrylonitrile are the preferred coating for embodiments with exposure to oil or gear lubricant.

Figure 5:
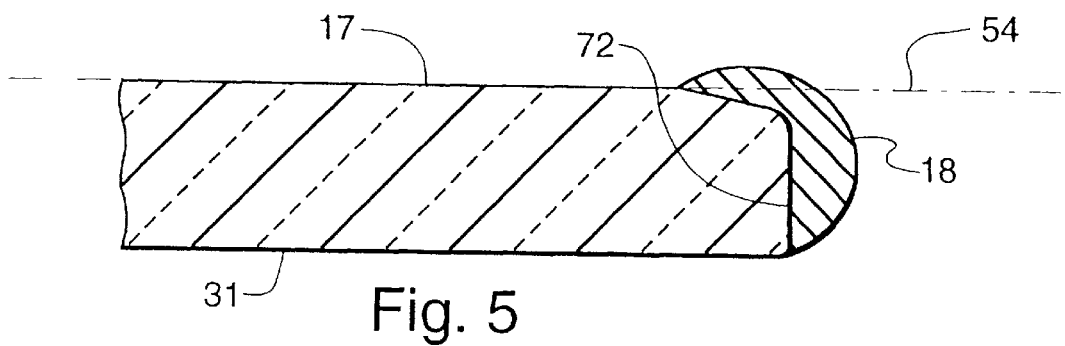
FIG. 5 is a drawing of an enlarged cross-section of a portion of a gasket having a coating on an aperture's gasket sheet edge (72), said edge being substantially perpendicular to opposed faces (17 and 31). The coating (18) here is wide enough, in a direction parallel to the edge, to go past the corner of the gasket which is at the top of edge (72), and past the facial plane (54). Here, the facial plane (54) is not the same as the corner plane (not indicated) which goes through the corner of the edge.

On each end of the aperture's gasket sheet edge there is a corner which abuts a gasket face. Each corner can be considered to lie in two different parallel, infinite planes (such as, for example, in FIG. 8 having plane 39 and plane 65). The plane is a "facial plane" when it goes through the substantially flat surface area of a gasket face. The facial plane thus contains the flat surface area of the gasket face. Generally, the edge of the gasket sheet around the aperture is substantially perpendicular to the facial plane. A plane is a "corner plane" when the infinite plane contains a corner between the face and the edge. In some cases the facial plane does not go through the corner so that there is both an infinite "facial plane" and an infinite "corner plane" (such as in FIG. 5 which shows the facial plane (54)) and FIG. 9 which shows corner plane (80) and facial plane (36). When the facial plane goes through the corner between the face and an aperture's gasket sheet edge the plane is both a corner plane and a facial plane (a "corner, facial plane"). A coating which extends beyond the corner existing between the edge and the face will protrude past the corner plane as does coating (41) of FIG. 9. The coating should protrude past the corner plane in order to provide the seal against fluids which would otherwise seep out onto the gasket face between the gasket face's surface and the flange.

In some preferred embodiments the coating protrudes past both a corner plane and a facial plane (in embodiments where the facial plane does not go through the corner of the aperture's gasket sheet edge). Such embodiments provide an even better barrier against fluids from going across the face of the gasket, between the face and the flange.

The "edge thickness" is the distance on the edge from one corner which lies between one face and the edge and the other corner which lies between the other face and the edge. In the present invention, to obtain sealing ability across the face of the gasket and through the gasket, the edge coating is wider than the edge thickness so that the edge coating goes beyond a corner plane on at least one side of the gasket.

In most cases the facial plane and the corner plane will be the same plane. In some cases, however, by using pressure, a facial area can be forced into a different plane than the rest of the face. When this is done abutting an aperture, the corner between the face and the edge may become rounded and it may be more difficult to place the location of the corner plane. In such cases the corner plane is easily located by noting the point where the cut portion of the edge ends; this point is in the corner plane. The cut portion of the edge typically contains more pores than the surface of either gasket face and is also distinctive in appearance by showing a cross-section of the materials inside the gasket.

Figure 1:
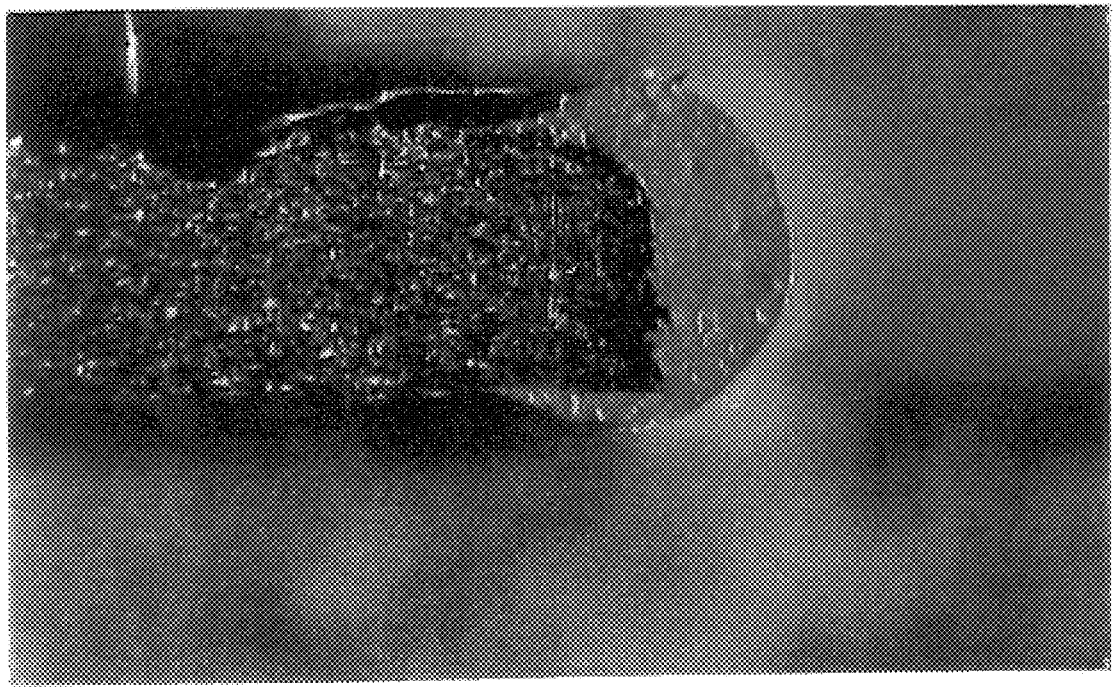
FIG. 1 is a photograph showing an enlargement of a cross-sectional portion of a gasket with an aperture having a coated edge. A portion of the coated aperture's gasket sheet edge is shown in the cross-section; this sheet edge is substantially perpendicular to opposed, parallel planes, one plane laying on each face of the gasket (a facial plane). In the photograph the gasket can be seen to have two faces which are substantially parallel. The corner between the coated sheet edge and face is seen in the photograph at the top and bottom of the gasket sheet. In a direction parallel to the coated edge of the gasket, the coating is wider than the edge and goes past the corner of the coated edge to thus protrude past the corner on the edge. Moreover, in fact, the coating is sufficiently wide so that the coating itself protrudes past the facial plane on at least one side of the gasket. The coating is a silicone rubber coating.
Figure 2:
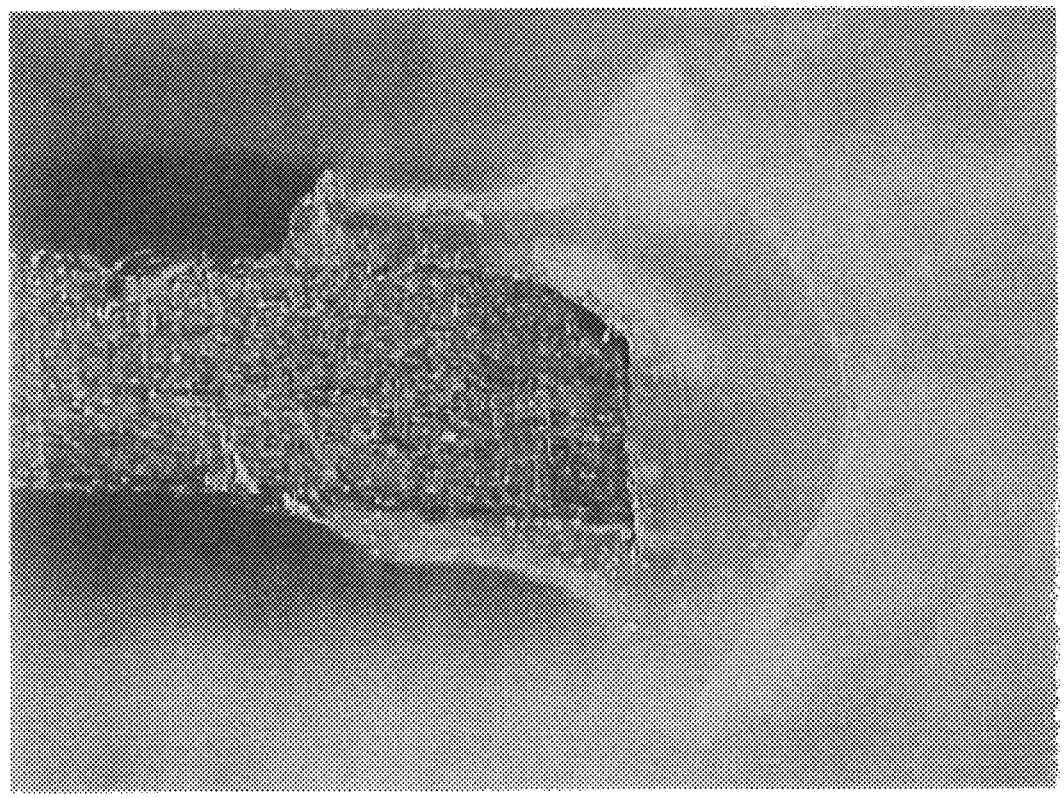
FIG. 2 is a photograph showing an enlargement of the cross-section of a portion of a gasket which has an aperture with a coated edge. A portion of the coated gasket edge is shown. The coated edge of the gasket sheet is seen and is substantially perpendicular to each face and to the opposed, parallel, facial planes that lie along each of the gasket's substantially parallel faces. In the photograph the corner between each face of the gasket and the coated edge of the gasket sheet is seen at the top and bottom of the gasket.
Figure 8:
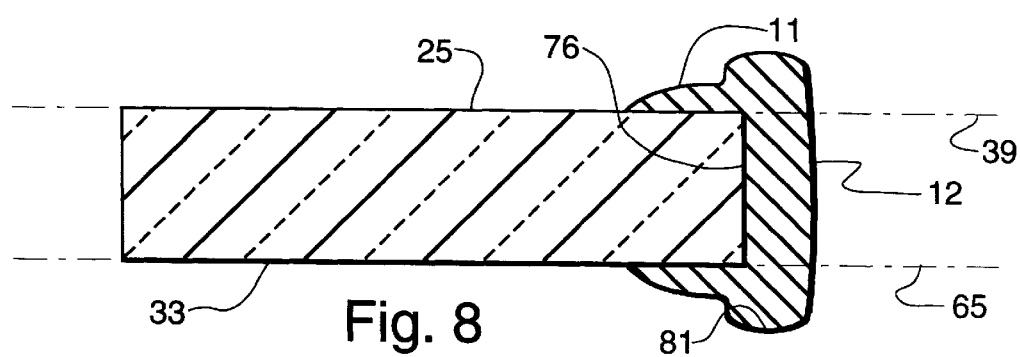
FIG. 8 is a drawing of an enlarged cross-section of the gasket of FIG. 7, as indicated. The coating (12) is indicated on the aperture's gasket sheet edge (76) and the extended portion (11) of the coating that laps onto face (25) is also indicated. Facial, corner planes (39 and 65) are shown. The coating protrudes past the planes, going in a direction parallel to edge (76). In more preferred embodiments the coating will protrude at least about 1 mil past that part of the coating that is on the face of the gasket, as is shown, for example, by FIG. 2 and FIG. 8.
Figure 9:
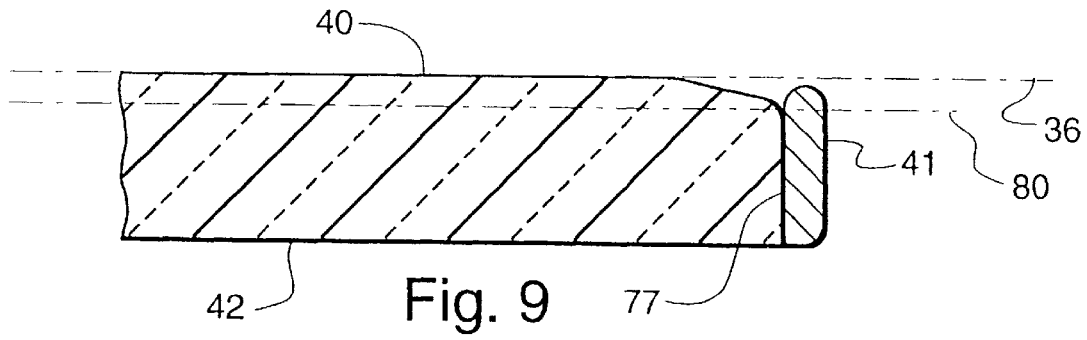
FIG. 9 is a drawing of an enlarged cross-section of a portion of a gasket having a coating (41) on the edge (77). The coating protrudes past the corner of the edge which lies between the face (40) and the edge (77), (thus going past the corner plane (41) but the coating does not extend past the facial plane (36). Such a coating, on one side of the gasket provides a barrier against fluids that might otherwise go from the aperture across the face (40) of the gasket, although the barrier (dam) is not as high, i.e. not as far past the face (24) as the coating of FIG. 6.
Figure 10:
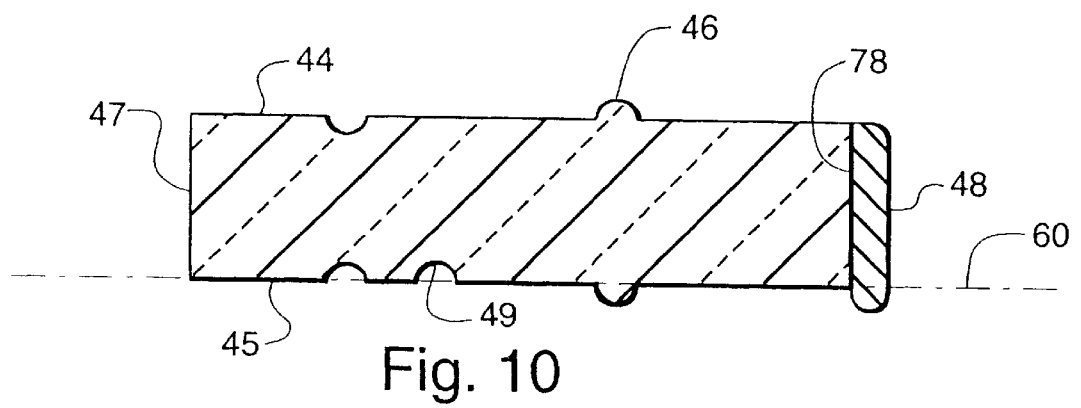
FIG. 10 is a drawing of an enlarged cross-section of a gasket which shows the outer edge or perimeter (47) of a gasket having coating (48) on an gasket sheet edge (78) of an aperture. The gasket has beading (46) and face areas which are lower (49) than the facial plane; these areas can be made by embossing. The coating (48) goes past the plane (60) which is both a facial plane and a corner plane. Faces (44) and (45) both show areas made by embossing and beading; the extension of the facial plane (60) is seen going through the gasket face, from one side of the gasket, through the gasket to the other side. It can be noted that the facial plane (60) contains the flat portions of the face (45) of the gasket and the corner between the coated edge (78) and the face (45).

The coating portion on the gasket edge, such as in FIGS. 9, 10, 4, 6, and 3 can be referred to herein as coating A. FIGS. 2 and 8 show embodiments where coating A is on the gasket material's edge, and since the coating also overlaps onto the face of the gasket, it also has a coating B. Thus, where the coating extends to cover the gasket face, the coating portion on the face can be referred to as coating B, such as is seen in FIG. 8 and FIG. 2; coating A is on the gasket edge. A coating like coating A which is on the outside perimeter of the gasket sheet edge is herein referred to as coating C. Where coating C extends over the face of the gasket it is coating B. Preferably, coating A extends past coating B, protruding past the surface of coating B at least about 1 mil on at least one side of the gasket; more preferably coating A protrudes at least about 5 mils past coating B, and most preferably coating A protrudes past coating B at least about 10 mils on at least one side of the gasket. The preferred embodiments has coating A protruding past coating B on both sides of the gasket. Features where coating A extends past the gasket face at the corner of the edge (thus protruding past the facial, corner plane), or where coating A extends past coating B, can be referred to as a "lip formation" or a "lip". This lip forms a dam or barrier against fluids on the aperture side of the coating.

At least one edge, which is around an aperture and is substantially perpendicular to the substantially opposed faces can be given a wide edge-coating which goes past at least one corner of the edge (protruding through the corner plane of that corner). In a direction from one of the corners between a face and the edge past the other corner between the other face and the edge and parallel to the edge, the protruding coating, should be sufficiently wide to give the gasket a better sealing ability than the gasket would have with a coating which just extended from one of the corner planes to the other corner plane (merely touching the corner plane).

Suitably, in this direction, the aperture's gasket sheet edge has a barrier (such as a coating) that protrudes past the corner plane a distance of at least about one mil. A coating from corner to corner will thus be at least about 1 mil wider than the edge is thick. Furthermore, it has been found that an even wider barrier coating will give an even better sealing ability. More preferably, therefore, the barrier protrudes at least about 5 mils beyond one corner plane. Suitably, the barrier ranges from about 1 to about 80 mils past the corner plane. The wide edge-coating can thus protrude past either or both corner planes a distance of from about 1 to about 80 mils. A more preferred range is from about 5 to about 80 mils, still more preferably the coating protrudes a distance of from about 10 to about 80 mils past the corner plane. Preferably, the wide edge-coating protrudes past at least one corner plane a distance of at least about 10 mils, more preferably the wide coating extends past each corner plane a distance of at least about 10 mils; gaskets with such coatings, in fact have been found to give a seal ranging from excellent to a total seal. This is true even with flange pressures of about 300 PSI or more, or about 25 PSI or more. A total seal is found where the coating will completely prevent fluids from leaking past the aperture, across the face of the gasket and also through the gasket sheet. To achieve such a seal it is preferred that the wide edge-coating protrudes past each corner plane a distance of at least about 15 mils.

Figure 3:
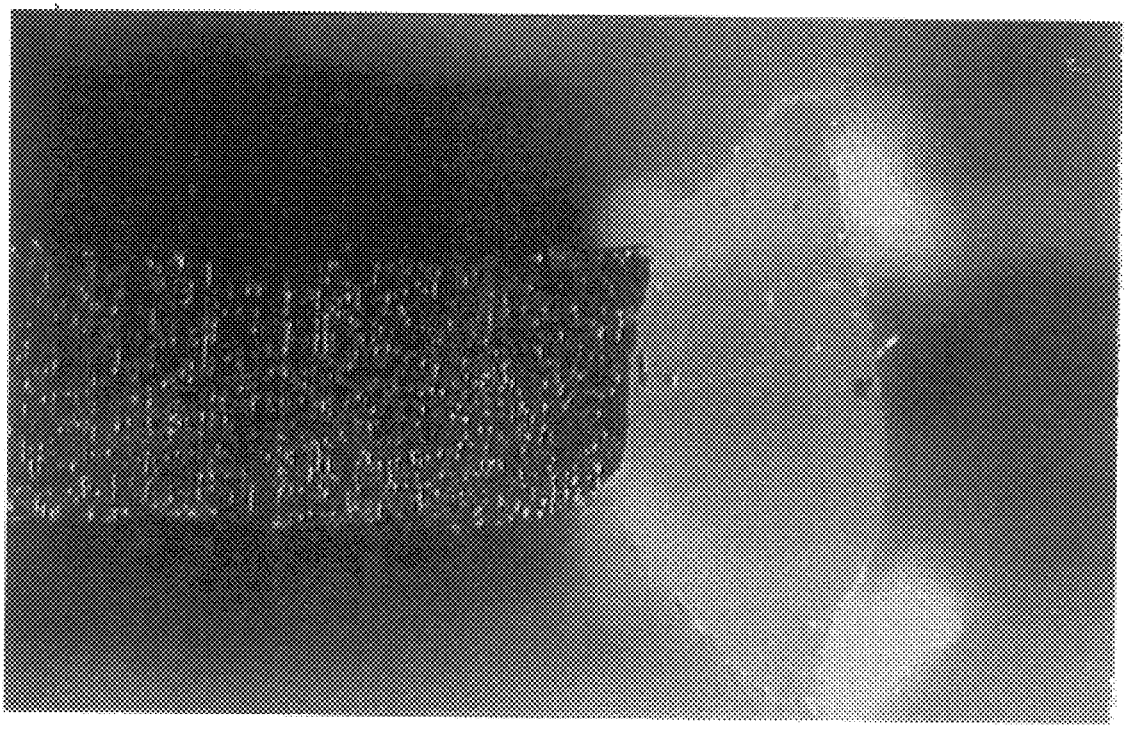
FIG. 3 is a photograph showing an enlargement of a cross-sectional portion of a gasket having an aperture with a coated gasket sheet edge. The coated edge is substantially perpendicular to each gasket face and to each of the opposed, parallel, facial planes that contains each gasket face. The photograph shows a portion of the coated edge on the gasket sheet. Also, the corner between each face and the coated gasket sheet edge is seen at the top and bottom of the gasket in the photograph. In the direction from corner to corner parallel to the gasket sheet edge of the gasket, the coating is wider than the edge and goes past each corner and, in fact, the coating is sufficiently wide so that the coating itself goes past the facial plane on each side of the gasket. In this embodiment the coating does not extend out onto either one of the gasket faces. The coating on each side of the gasket gets gradually wider than the edge until the coating comes to a point. The embodiment of this photograph provides a gasket with a sealing ability ranging from a good seal to a total seal and simultaneously provides the best (most optimized) compression failure resistance since neither of the gasket's faces has any coating to seal the gasket. The coating is an acrylic latex.
Figure 4:
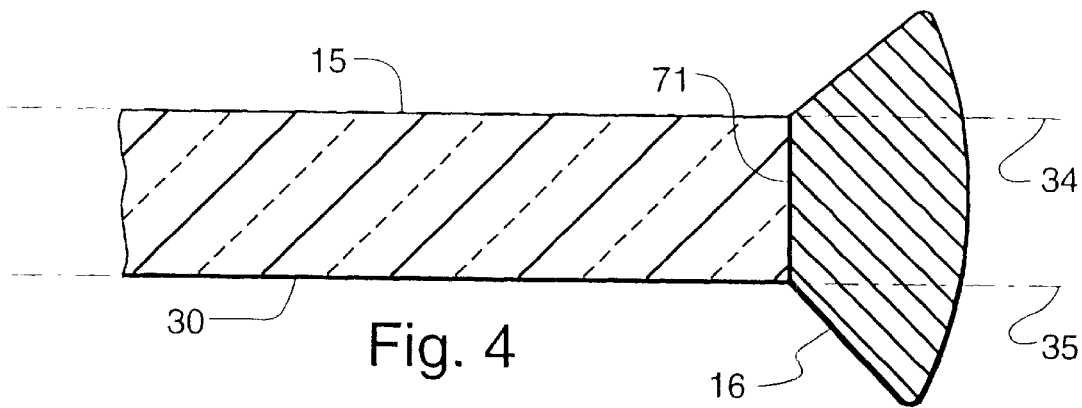
FIG. 4 is a drawing of an enlarged cross-section of a portion of a gasket having a coating on the gasket sheet edge (71), said edge being substantially perpendicular to the opposed planes (34 and 35) containing the gasket faces (15 and 30) and the coating, in a direction parallel to the edge is sufficiently wide so that the coating goes past the planes (34 and 35) on both sides of the gasket. Here, plane 34 and 35 are both a facial plane and a corner plane (going through the corner between the face and the coated gasket edge). The coating, getting gradually larger in a direction going away from the gasket's edge (71), thus gives the coating a tapering effect so that the surface of the coating forms an inclined plane up to its widest point. This forms a barrier against the passage of fluids across the face of the gasket. This is a preferred embodiment of the present invention (also shown in FIG. 3).

For a gasket giving a total seal it is also preferred that from the edge surface, in a direction going into the aperture parallel to the facial plane and away from the edge, the coating on the edge gets gradually wider (as seen in FIGS. 2, 3, and 4) forming an inclined plane, until it comes to the coating's widest point at some distance from the edge. The distance from the edge that the coating extends and reaches its widest point is not critical. Suitably, however, in such an embodiment, the coating is at least one mil wider than the thickness of the gasket edge. Preferably the coating is at least 5 mils wider than the thickness of the gasket edge. It is preferred that a "lip" is formed, such as in FIG. 6, or such as in FIGS. 2, 3, and 4 (where the lip resembles an inclined plane and is formed by the coating getting gradually wider going away from the aperture's gasket sheet edge).

In embodiments where a face has a facial plane that does not go through a corner between the face and a plane, it is optionally preferred to have a barrier that protrudes beyond the facial plane. Suitably the barrier will protrude past the plane in an amount effective to give a better seal than the gasket would have if the barrier merely came up to the facial plane but did not go past it. The coating can protrude at least about 1 mil beyond such a facial plane; more preferably it extends at least about 5 mils beyond such a facial plane and even more preferably it extends at least about 10 mils beyond such a facial plane. Preferably, the barrier will go at least about 1 mil past at least one facial plane; more preferably it will go at least about 5 mils past at least one facial plane, and even more preferably the coating will go at least about 10 mils past at least one facial plane; total seals have been achieved particularly when the coating protrudes at least about 15 mils past the facial plane; in a preferred range the barrier will extend from about 5 to about 80 mils past at least one facial plane (including embodiments where the facial plane lies above or outside the corner plane on the face of the gasket as noted in FIG. 5 and FIG. 9). The more preferred embodiments has the barrier in the form of a coating extending beyond the facial plane on both faces of the gasket.

The coating can be put on in any film-forming manner such as, for example, dipping, melting or painting the exposed edge while protecting any gasket portions not to be coated. In one embodiment a coating can be put on an aperture edge (the edge of the gasket sheet) by placing a plurality of gasket sheets together so that a cavity is formed from the apertures of the plurality of gasket sheets, and then contacting the edge of each gasket sheet along the cavity with a coating material so that the edges become coated in an amount effective to achieve a substantial sealing of the gasket along the edge of the gasket sheet at the aperture where the edge is coated. The sides of the cavity are the aperture edges to be coated. The coating material is put into the cavity, contacts the edges to be coated to form the coated edges, if there is any coating material left it is removed, and then the gasket edges are dried.

However, even when the gasket sheets are placed together to form a cavity from the apertures and the coating contacts the surface of the cavity, then separating the gaskets while the coating is viscous or elastic (before the coating cures or becomes hard) will stretch the coating so that it becomes wider than the aperture's gasket sheet edge. When the coating has partially cured or when it is plastic and moldable, then separating the sheets can cause the coating on the edge to be more pointed and wider than the aperture's edge (this is shown by FIGS. 2 and 3) forming an inclined plane. This technique is done easily and preferably with acrylic latex.

The gaskets can be aligned and placed together so that they abut, or, in some of these embodiments it may be desired to place other sheets (spacers) in between two or more of the gasket sheets. One method which can be used to aline the stack of gaskets or the stack of gaskets and spacers is to cut the sheets identically giving each the aperture with the edge to be given the coating and also at least one, preferably two "rod-receiving apertures". A rod is put through these rod-receiving apertures to get the gaskets or gaskets and spacers aligned and keep them alined while the coating composition is contacting the aperture edges to be coated. Bolts can be used at each end of the rod to secure the gasket stack and make sure that they are tightly held together.

The stack of gaskets or gaskets and spacers are preferably alined to form the cavity into which the coating must be put in order to contact the edge to be coated. In another preferred embodiment, when the sheets are secured together, (with or without spacers), it is preferred that a holding container ("well") for the coating composition be attached or at least placed at one end of the cavity which was formed by the sheets. The stack of sheets together with this coating-filled well can be tipped so that the coating runs from the well and into the cavity along the sheet edges so that they are contacted and coated. Preferably the stack of sheets and well are rotated together so that the edges become completely coated. Using the coating-filled well in this method advantageously, 1) minimizes the problem of catching or making air bubbles in the coating, 2) allows a maximum surface to be coated with a minimum volume of coating, and 3) facilitates the edge-coating on a multiplicity of gaskets.

Sheets placed in between the gaskets are referred to as "spacers" which separate the gaskets from each other. The advantage of using spacers is that the spacer will allow more coating to be applied to the edge and the spacer will also allow the coating to go onto the edge only in the exposed locations so that the resulting gasket coat has a particular configuration. Spacers, for example can be used to obtain coatings having the configuration of FIG. 4, 6, or FIG. 8.

Figure 7:
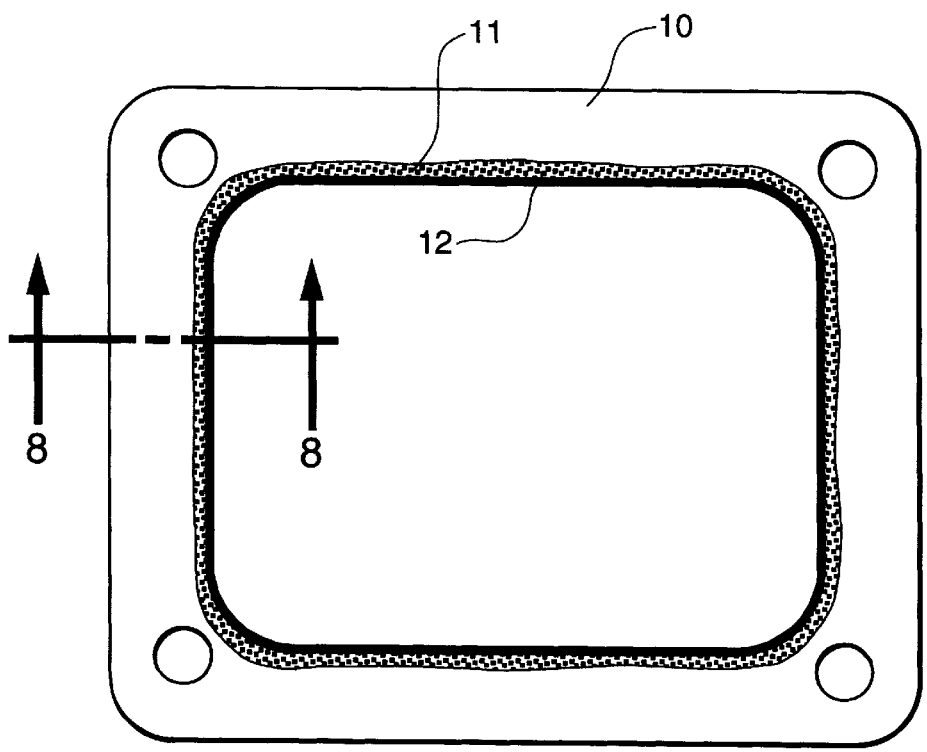
FIG. 7 is a drawing of a gasket (10) having a coated edge (12) and a portion of the face of the gasket is also coated (11).

The spacer sheets have apertures, but the apertures can be 1) the same size as, 2) wider than, or 3) smaller than the apertures of the gaskets. The particular spacer sheet will result in a coating configuration that is characteristically produced by that spacer. For example, when the spacer aperture is wider than the aperture of the gasket, a portion of the gasket sheet face is exposed, and the coating material contacts the gasket face around the edge and coats the face where it is exposed around the aperture. This type of spacer characteristically produces coatings that are wider than the gasket edge and thus protrude past the facial plane, but which also have the gasket face coated near the aperture as is indicated in FIGS. 7 and 8.

When the spacer aperture is smaller the gasket sheets will be separated from each other and the coating is prevented from overlapping the corner of the edge onto the face of the sheet. The coating, however may still be wider than the gasket edge in the direction parallel to the edge so that the coating protrudes past the face, if the spacers and gaskets are separated when the coat is liquid or plastic enough to stretch or flow into a lip formation. This type of spacer, however, could also be used to make gaskets which only have the coating on the edge of the gasket. Spacers can be coated to make the gasket coating material release easily. Spacers can also be used to form the protruding coating on an edge. In other embodiments the spacers can be configured to give the final wide edge-coating a different shape particularly where the coating protrudes past the corner plane.

When the spacer is given an aperture that is wider than the gasket aperture, the spacer aperture suitably has an aperture that is from about 5 to about 125 mils larger than the gasket aperture. This allows some of the coating to deposit on the exposed gasket face. When the spacer must have an aperture that is smaller than the gasket aperture it is preferred that the spacer aperture be in the range of from about 3 to about 12 mils smaller than the gasket aperture. Spacers can even be used which have apertures that vary from being wider than the gasket aperture in some locations, the same size in other locations, and smaller than the gasket aperture in other locations. Thus the spacer aperture can be from about 5 to 125 mils wider than the gasket aperture in some locations and also from about 3 to about 12 mils smaller than the gasket aperture in other locations. A spacer can even have an aperture ranging from about 5 mils wider to about 3 mils smaller than the gasket aperture.

The spacer sheets themselves must be thick enough to allow a separation of the gasket sheets, at least about 5 mils thick, which will place the gaskets 5 mils apart when their aperture edges are coated. The spacers can have a thickness in the range of from about 5 to about 150 mils. It is, however, preferred to use spacers with a thickness in the range of from about 10 to about 40 mils thick.

It has also been discovered that spacers can be used which are highly porous. The highly porous spacers advantageously allow the liquid of the coating to be absorbed into the spacer. The absorption of the coating liquid will dry the coating faster, allowing a solid coat to form faster on the edge of the gasket. A highly porous spacer has a minimum void volume of at least about 35%. Preferably, the porous spacer has from about 35 to about 75% void volume. A "non-porous" spacer has a maximum of about 15% void volume, suitably from about 15 to about 0.01% void volume.

In still other embodiments, some of the aperture's gasket sheet edge can be protected from the coating material so that only a portion of each edge of the gasket sheet at the aperture are contacted with the coating material. This can be useful where the edge is close to a bolt area. Where the edge is within, for example, 3.5 cm. (centimeters) of a bolt, it may be desired to preserve more compression resistance by not adding coating even to the edge. The extra pressure added by the bolt will be effective to give some added sealing ability to the gasket, so that it may not be necessary or desired to completely coat the aperture's gasket sheet edge. To achieve such embodiments a spacer sheet is configured to cover the portion of the edge which is not to be coated. Where the gasket must seal against fluids that would go through the sheet of the gasket, however, the coating material should contact the edge portion to be coated so that the coating material covers the edge going completely from one corner to the other corner. A bolt area is an area near or under the bolt where higher pressure is put on the gasket than on areas further away from the bolt.

Any vertical edge between the opposed faces of a gasket sheet material can be given a coating, including the edge which forms the outer perimeter of the gasket. The coating can be organic or inorganic. When the vertical edge is one which encounters fluids during use, however, a polymer coating is particularly useful and preferred.

Optionally, a coating strip (coating B) can be put on one or both faces completely around an aperture so that it abuts the edge perpendicular to each face and also abuts or even joins with the coating on the aperture's gasket sheet edge (coating A). The coating strip can be beneficially used where the flanges do not fit together tightly to form a fitted seal against fluids. If, for example, a flange is warped even slightly so that it curves away from a planar (flat) surface, the coating strip can be useful in providing a better seal against fluid leakages. For such applications, the coating strip will preferably be put around the aperture where fluids are encountered in use.

The coating on the aperture's gasket sheet edge (coating A) can overlap onto either or both faces, forming coating B. The overlap can extend a distance ranging from just a trace, less than 1 mil or can extend over the entire gasket surface. The edge coating on the vertical edge can lap over onto either or both faces of the gasket (such as is shown, for example, in FIG. 8). Preferably, the sealing coating can extend up to about 1.5 cm. on the face of the gasket. More preferably, it extends a maximum of about 5 millimeters (mm) across the face of the gasket, and most preferably it extends a maximum of about 1 mm; such embodiments are for good compression resistance (minimizing coating on the gasket faces).

Optionally, each gasket face or a portion thereof, can be given only a release coating, and not any coating for sealing the gasket. This will give the gasket more compression resistance. Release coatings, in general do not substantially affect compression resistance. A release coating is normally less than 1 mil in thickness. The coatings to seal the gasket, however, are heavier, thicker, and generally more penetrating into the gasket and gasket pores than is a release coating; thus, the coatings for sealing ability are detrimental to compression resistance and are thus limited in embodiments where it is important to preserve compression resistance.

It has been found that the thickness of the coating on the face of the gasket also will be detrimental to compression resistance. For this reason therefore, it is preferred that the overlap of the edge coating onto the face of the gasket is a maximum of about 11 mils thick in order to preserve compression resistance.

When the release coating is to be used, for best performance, the release coating does not penetrate the gasket structure. This will give the gasket more compression failure resistance than if the release coating penetrated. A suitable release coating is a flouropolymer containing polymer coating.

Practicality is the factor limiting the thickness of the coating on the vertical edge, that is thickness in both the direction parallel to the vertical edge and perpendicular to the vertical edge. Very small thicknesses (going perpendicular to the edge) have been found to be effective. Since a relatively thin coating is effective it will be cost effective to limit the thickness and width of the coating on the vertical edge of the gasket aperture.

The coating thickness, in the direction perpendicular to the vertical edge and parallel to the facial plane thus, is not critical. The coating preferably is a minimum of at least about 0.1 mm thick and preferably can be up to about 2 mm thick. The coating on the vertical edge is intended to seal the gasket against fluids from going both through the gasket sheet edge and across the surface of at least one gasket face. The coating should have a minimum thickness needed to seal the gasket against fluids from going through the aperture's edge. Suitably the sealing coating on the edge of the soft gasket sheet should be at least about 1 mil in thickness (extending in a direction perpendicular to the vertical edge). Preferred embodiments will have a protruding edge forming a barrier that goes beyond the corner plane a sufficient distance to give the gasket a seal against fluids from going across at least one gasket face, and preferably across both faces.

Inorganic materials which can be used as a coating includes chemically delaminated vermiculite and mica coatings. Preferred coatings are polymers. The polymer coatings can be used to form either coating A, coating B, and/or coating C. Polymer coatings include organic, inorganic, inorganic/organic hybrid polymers as well as filled polymers. Suitably the polymer coating materials are coatings selected from the group consisting of acrylic, acrylonitrile, polyvinylidene chloride, fluorosilicone, polyurethane, acrylonitrile butadiene rubber (NBR), fluoro polymers, hydrogenated NBR, silicone rubber coatings (both UV curable and room temperature curable), styrene butadiene polymer, fluoroelastomer polymer, fluorosilicone polymer, acrylic-acrylonitrile polymer, carboxylated acrylonitrile polymer, carboxylated styrene butadiene polymer, chloroprene rubber polymer, ethylene propylene rubber polymer, ethylene/vinyl acetate, epoxy, and mixtures thereof can be used. Any latex can be used. Also suitable as a coating are polymer powders which are heated to melt them onto the surface of the gasket. In fact, any powder which can be fused can be used to seal and coat the gasket. Coatings A, B, and C can be made by different coatings or they can be the same material.

EXAMPLES

Two identical annular gaskets were cut from a cellulose based paper gasket sheet material. Each gasket formed a ring and had the following measurements: Inner diameter 0.515 inches (distance from the center of the aperture to the inner edge of the ring), outer diameter 0.95 inches; ring width 0.2175 inches. The gaskets each had two substantially flat, opposed faces and each ring aperture had an edge that was substantially vertical and substantially perpendicular to each face. The edge thickness (also the gasket thickness) was measured at 32 mils thick.

The gasket ring for sample A was left completely uncoated as the control. For sample B, an acrylic latex was used to coat the gasket ring sample on the inner vertical edge of the ring aperture. The coating was put onto the aperture's gasket sheet edge so that the coating was wider than the thickness of the aperture's edge (wider than the gasket thickness), and went past each corner of the inner, vertical edge by approximately 27 mils on each side, measuring the coating at its widest point. The distance from the inner, vertical edge of the gasket to the surface of the coating at the center of the gasket was measured at about 0.9 mm. (millimeters). The coating on the edge of the gasket sheet at the aperture was like the coating shown in a cross-sectional view in FIG. 4 and FIG. 3.

The gasket was tested in a cylinder which could be pressurized with nitrogen. The nitrogen pressure in the cylinder was brought up to 14 PSI (pounds per square inch), and the number of minutes which elapsed while the pressure decayed to 13 PSI was measured. Each gasket was placed in the cylinder's flange and the flange was tightened. The test was done on a smooth flange measuring 18 RaMS (Ra is the average roughness value and this is measured in micro-inches; MS indicates micro-inches). The flange was tightened and the pressure level of the flange was measured in pounds per square inch (PSI).

Sample A for this test held the pressure only for 1.5 minutes and required a flange pressure of 2100 PSI. Sample B, the wide edge sealed gasket, delivered a total seal (pressure never decreased in the cylinder), and the flange pressure of the cylinder on the gasket of sample B was only 300 PSI.

We claim:

1. A process for coating aperture edges of a plurality of soft gasket sheets wherein each gasket sheet has two substantially opposed facial surfaces with the aperture edge of the gasket sheet being substantially perpendicular to the facial surfaces, the process comprising the steps of stacking the plurality of gasket sheets together, wherein the aperture of each gasket sheet is substantially identical in size and shape, and the gasket sheets are stacked together so that a cavity is formed by the apertures of the plurality of gasket sheets, and contacting the edges of the apertures of the stacked gasket sheets with a coating material so that the edges become coated in an amount effective to achieve a substantial sealing of the gasket along the edge of the aperture where the edge is coated, and wherein a well holding the coating material is located at one end of the cavity formed by the apertures of the plurality of gasket sheets and wherein further, the edges of the apertures are contacted with the coating material by tipping the well and the gasket sheets so that the coating runs from the well and into the cavity along the aperture edges so that they are contacted by the coating material and coated.

2. The process of claim 1 wherein the plurality of gasket sheets has at least one spacer having a shape substantially corresponding to the shape of the gasket sheets and also having an aperture, located between at least two gasket sheets.

3. The process of claim 2 wherein the aperture of each gasket is identical in size and shape, and each spacer is either A) the same size as, B) wider than, or C) smaller than the aperture of the gasket sheets on each side of it.

4. The process of claim 3 wherein the aperture of each spacer is B) wider than the aperture of the gasket sheets on each side of it.

5. The processs of claim 3 wherein the aperture of each spacer is from about 5 to about 125 mils larger than the aperture of the gasket sheets on each side of it.

6. The processs of claim 3 wherein the aperture of each spacer is from about 3 to about 12 mils smaller than the aperture of the gasket sheets on each side of it.

7. The processs of claim 2 wherein each spacer has a thickness of at least about 5 mils.

8. The processs of claim 2 wherein each spacer has a thickness in the range of from about 5 to about 150 mils.

9. The processs of claim 2 wherein at least one spacer has a minimum void volume of at least about 35%.

10. The processs of claim 2 wherein at least one spacer has a void volume in the range of from about 35% to about 75%.

11. The processs of claim 2 wherein at least one spacer has a maximum void volume of about 15%.

12. The processs of claim 2 wherein at least one spacer has a void volume in the range of from about 15 to about 0.01%.

13. A method of fabricating a plurality of substantially identical gaskets each having an aperture edge coated with a coating material formulated to enhance sealability around the aperture, said method comprising the steps of:

(a) stacking the plurality of gaskets together with their aperture edges mutually aligned to define a cavity;

(b) forming a well at one end of the cavity;

(c) at least partially filling the well with coating material; and (d) tipping the well and the stacked gaskets to cause the coating material to flow from the well and into the cavity to contact and coat the aligned aperture edges of the stacked gaskets.

14. The method of claim 13 and wherein step (b) comprises providing a plate with a well formed therein and positioning the stack of gaskets on the plate with the well aligned with the cavity defined by the aperture edges of the stacked gaskets.

* * * * *